Aug. 21, 1923.

H. E. ELLIS 1,465,579

PULP MAKING MACHINE

Filed March 19, 1920

Inventor
H. E. Ellis.

By D. Swift

Attorney

Patented Aug. 21, 1923.

1,465,579

UNITED STATES PATENT OFFICE.

HARRY ELLWOOD ELLIS, OF LEESBURG, FLORIDA.

PULP-MAKING MACHINE.

Application filed March 19, 1920. Serial No. 367,052.

*To all whom it may concern:*

Be it known that I, HARRY ELLWOOD ELLIS, a citizen of the United States, residing at Leesburg, in the county of Lake, State of Florida, have invented new and useful Pulp-Making Machines; and I do hereby declare the following to be a full, clear, and exact description of the invention, such as will enable others skilled in the art to which it appertains to make and use the same.

The invention relates to the production of pulp suitable for manufacture into paper, board or similar products, preferably from fibrous plants growing mostly in tropical or semi-tropical regions. Owing to the rapid growth of these plants, the non-cellulose tissue is subject to rapid decay, rendering it necessary to separate the fibre as soon as possible after the plants are cut; the non-cellulose tissue in these plants is readily reduced to a liquid by a combination of chemical and mechanical treatment as hereinafter described. The chemical used is preferably soda ash or lime, which have been found to give the desired results. Various chemical solutions may be used according to the kind of plants to be treated. Therefore it is the primary object of the invention to provide an apparatus wherein the raw material will be shredded, passed through a separator, thence into beating machines from which beating machines in which steam has been applied the material passes to a stuff chest where it is cooled and the steam from the material allowed to escape to the atmosphere. A solution being applied to the material while it is in the beating engine and before it is transferred to the stuff chest. Then to convey the material from the stuff chest to a second beating engine where it is subjected to steam and treated by rollers after which the material is passed to a second stuff chest where it receives the treatment similar to the treatment received in the first stuff chest. The material being then passed to a save-all from which save-all it may be conveyed to a washer, or if so desired conveyed back to the second beating machine for additional treatment. The second batch of material may be passed to the first beating machine after the first batch has been removed from the same.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
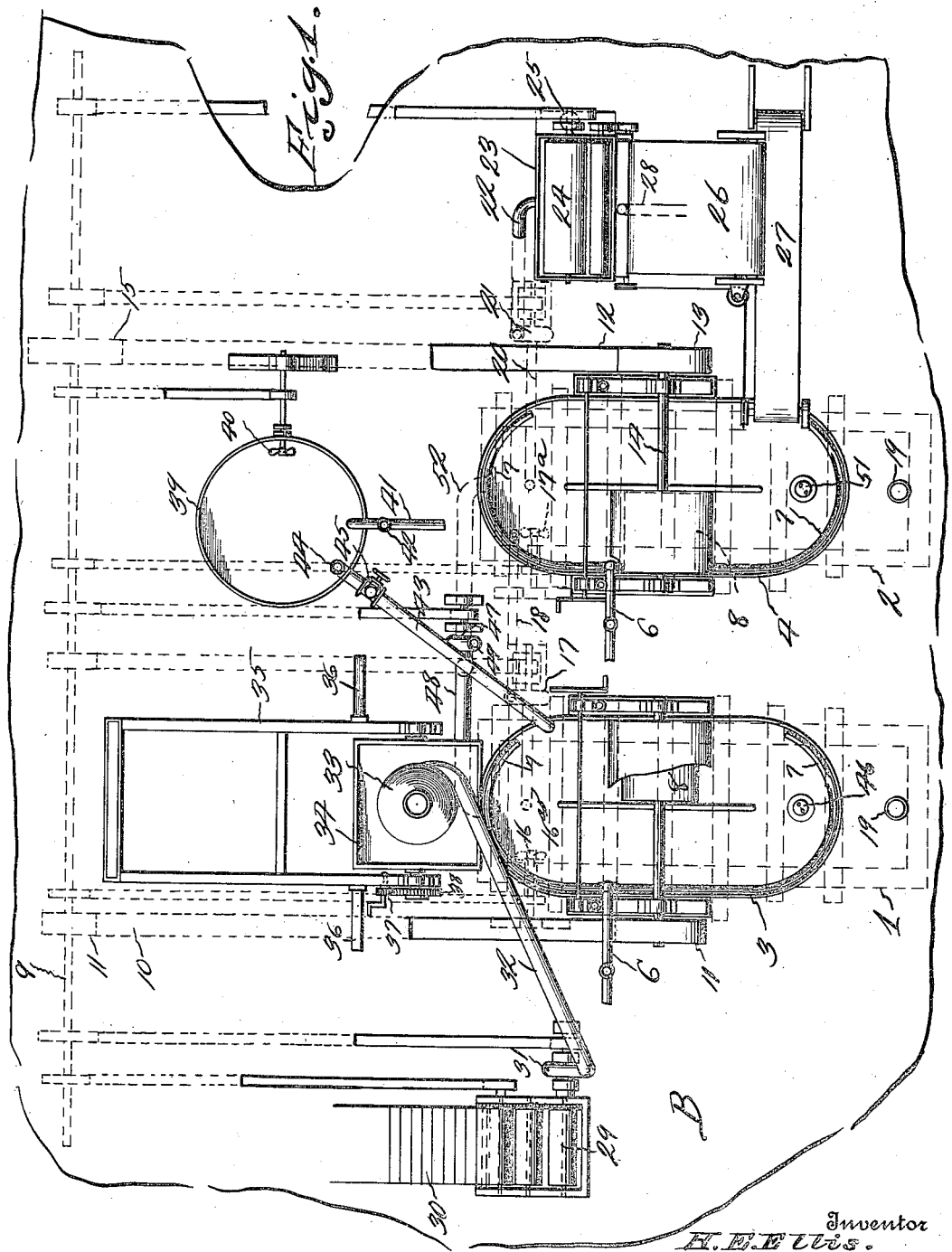
Figure 1 is a plan view of the apparatus.
Figure 2:
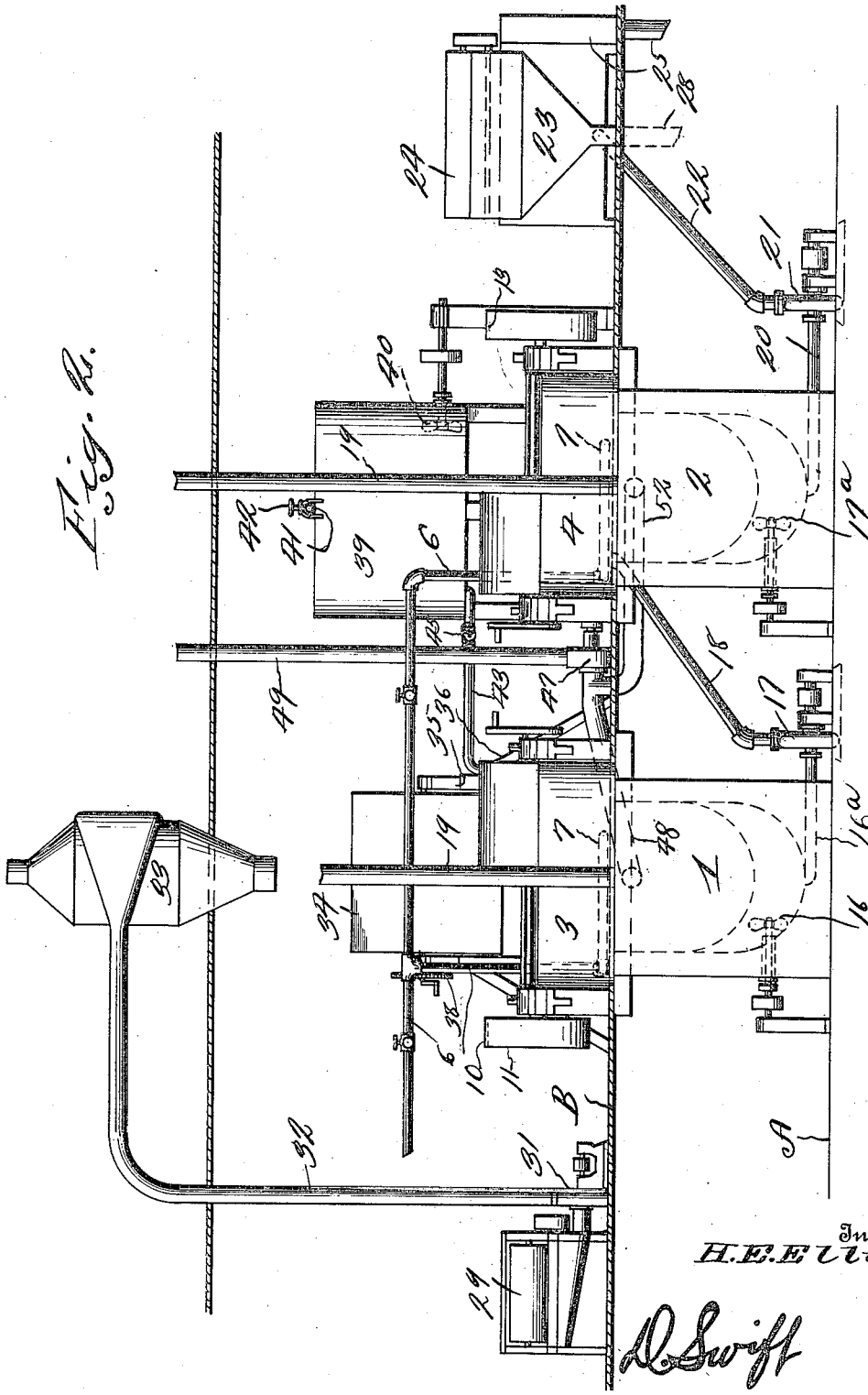
Figure 2 is a front elevation of the apparatus.
Figure 3:
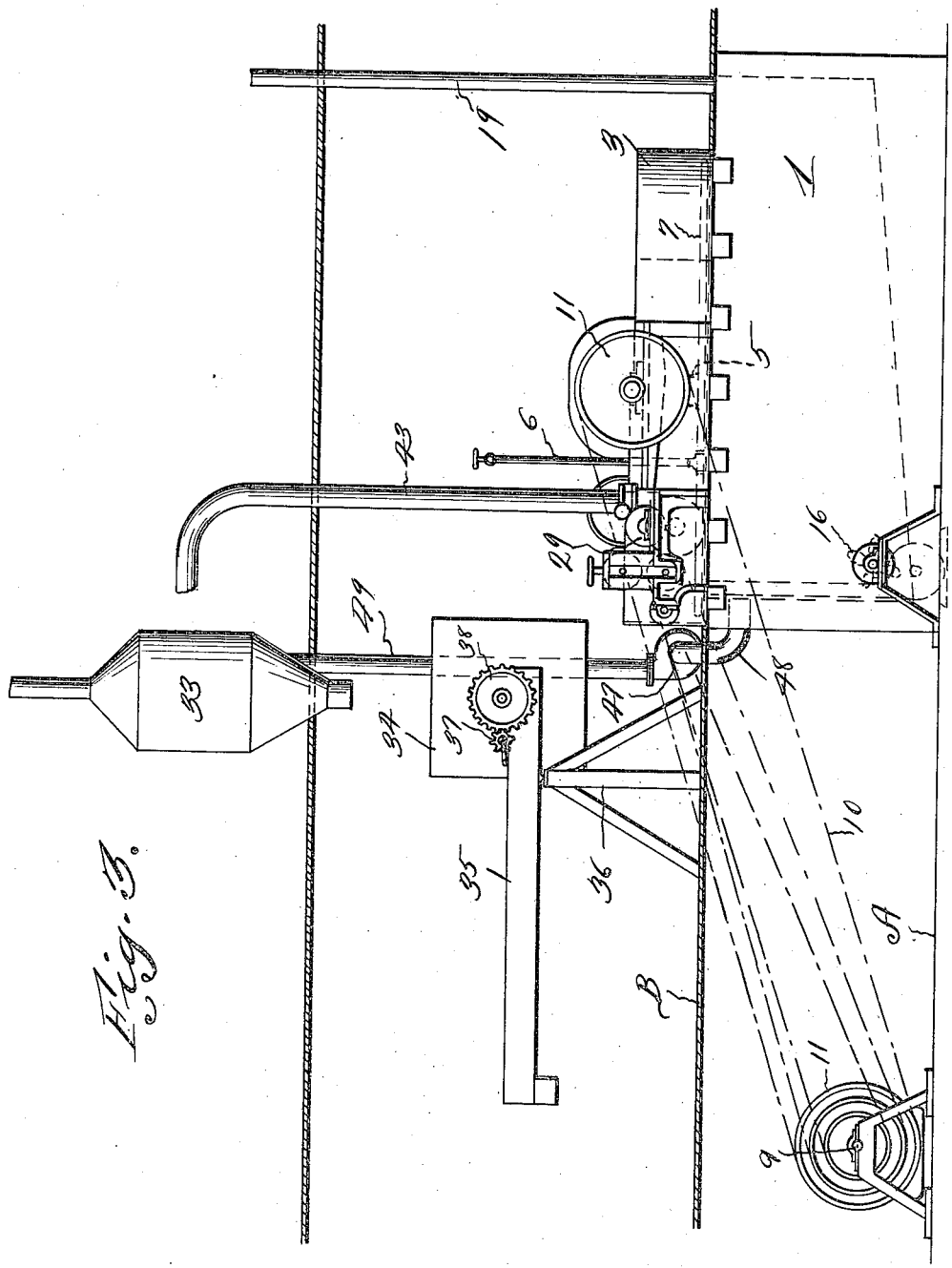
Figure 3 is a side elevation.

The apparatus as a whole is disposed on two levels A and B, part of the apparatus being on each level. These levels may be concrete bases if so desired. Disposed on the level A are stuff chests 1 and 2, which stuff chests are preferably in the form of a parallelogram and of a size suitable to form the foundation for two beating engines 3 and 4, which beating engines are of a conventional form, however they are preferably of the type known as the Hollander type. These engines are without washers and the bed plates 5 are of stone. Both engines are fitted with steam pipes 6 having portions 7 which are preferably perforated disposed adjacent the bottoms and sides of the engine casing. The rolls 8 of both engines are adjustable in the usual manner. Engine 3 is driven by means of a belt and pulley connection with a line shaft, said belt and pulleys being designated by the numerals 10 and 11. Engine 4 is driven by means of a belt 12, which belt passes over a pulley 13 carried by the shaft 14 of the engine and over a pulley 15, carried by the line shaft 9. Each of the stuff chests 1 and 2 is provided with propeller agitators 16 and 17$^a$, which agitators are driven through belt and pulley connections with line shaft 9. The stuff chest 1 has connected thereto by means of a pipe 16$^a$ a centrifugal pump 17, pipe 16$^a$ being connected to the lowest point of the stuff chest 1. The discharge pipe 18 leads from the pump 17 to the beating engine 4. The stuff chests 1 and 2 have each a ventilating pipe 19 extending from the upper end of the stuff chests, preferably through the roof of the building in which the apparatus is disposed. The stuff chest 2 has connected thereby by means of a pipe 20, a centrifugal fan 21, which fan is adapted to pump the material from the stuff chest 2 through the pipe 20 which is connected to the lowest point of the stuff chest 2 and discharge the material through a discharge pipe 22 which leads to a Decker saveall 23, which saveall is provided with a press roll for pressing the material, said press roll being of conventional form and designated at the numeral 24. The liquid solution extracted from the pulp in passing through the saveall 23 is discharged through the pipe 25. The pulp from the saveall may be discharged onto the belt conveyor 26 and thence deposited on the conveyor 27 and be returned to the beater engine 4, or if the material has been sufficiently treated it may be discharged through the pipe 28, which leads to a washer or to some other point of deposit. A crushing and shredding machine 29 is provided which crushing and shredding machine is preferably of the type set forth and claimed in my application for patent filed December 29, 1919, Serial No. 347,928. However, it is to be understood that any type of crushing and shredding machine may be used. The crusher and shredder are preferably provided with a conveyor 30 for feeding the raw material to the shredder and crusher where it is reduced to a finely divided condition and is withdrawn from the shredder and crusher by means of a centrifugal pump 31 which discharges the shredded and crushed material through the pipe 32, which pipe leads to a separator 33, where the material is separated from dust and other foreign matter. All of the centrifugal pumps are operated through belt and pulley connections through the line shaft 9.

The material after it passes through the separator 3 is deposited in a pivoted hopper 34, which is pivoted in one end of the counterpoise frame 35, which frame is in turn pivoted on supports 36. By providing the counterpoise frame 35, it will be seen that the material deposited in the hopper 34 may be weighed before the same is dumped into the beating engine 3. The hopper 34 is tilted by means of a gear 37 which is pivoted to the side of the frame 35, and which gear meshes with a gear 38 carried on the hopper shaft. Thus it will be seen that by rotating the gear 37 that the hopper 34 may be inverted and the material dumped into the beating and mixing tank 3. A solution tank 39 contains the solution which is mixed by an agitator 40, which agitator is rotated through belt and pulley connections with the line shaft 9. The solution is mixed by the agitator 40 and water is supplied to the tank 39 through the supply pipe 41, which pipe is provided with a valve 42 for controlling the flow of water into the supply tank. The mixed solution is conveyed by the beating machine 3 to a discharge pipe 43 which has one of its ends disposed in a beating machine 3 and its other end connected as at 44 to the under side of the mixing tank 39, there being a valve 45 for controlling the flow of solution from the tank 39 to the beating engine 3.

The operation is as follows: The raw material is conveyed to the shredder and crusher 29 by the conveyor 30 where it is passed through the rolls, shredded and cut the short lengths, suitable for treatment. The centrifugal pump 31 withdraws the shredded material from under the shredder and crusher and discharges it through the discharge pipe 32 and separator 33 into the hopper 34. The hopper 34 is fitted with means for weighing the material deposited therein as hereinbefore described, therefore the amount of material passed through the apparatus may be ascertained. When the proper weight of material has been discharged into the hopper 34 it is inverted by means of the gears 37 and 38 and the crank carried by the gear 37, so that the contents can be emptied into the beating engine 3. The proper solution for treating the material, that is the particular material, is mixed in the tank 39 and if so desired a series of tanks may be utilized. A sufficient quantity of the solution is drawn from the tank 39 by means of the discharge pipe 43, which discharge pipe is controlled by the valve 45 to bring the charge of the beating engine 3, in combination with the shredded material, to the proper consistency and to fill the engine. The roll 8 of the engine 3 is started and steam turned on through the pipes 6 and 7 so that the contents of the beating engine are brought to the boiling point and kept circulating in the ordinary way; care being taken that the roll 8 is not set down hard upon the bed plate 5. When the contents of the engine 3 are sufficiently reduced, they are discharged by lifting the valve plate 46 which allows the material to flow into the stuff chest 1. The beating engine 3 can then be recharged if so desired. When the charge from the beating engine 3 is let down into the stuff chest 1, a great deal of steam is given off by the material, this is withdrawn by means of the centrifugal fan 47, which sucks the steam through the suction pipe 48, which is connected to the stuff chest 1, adjacent its upper end, and discharges the steam through the exhaust pipe 49, the steam being replaced by air entering the stuff chest through the ventilating pipe 19. The object of this operation is not only to dispose of the steam, but to slightly cool the pulp. The centrifugal pump 17 being started, the contents of the stuff chest 1 are withdrawn through the pipe 16ª and discharged through the 18 into the beating engine 4, the agitator 16 keeping the material in motion. The whole of the contents of stuff chest 1 is pumped over into beating engine 4 and kept circulating in the usual way. Steam is turned on through the pipes 6 and 7 and the material brought again to a boiling point. The roll 8 in the beating engine 4 is set down on a bed plate 5 so as to reduce the pulp as rapidly as possible by the combined action of the chemical solution, steam, and the action of the beater roll. The pulp is treated in the beater engine 4 until reduced to the desired quality, in the case of some materials, with others, it may be necessary to press out the solution and return the pulp to the beater engine 4, or to a third engine for treatment with a different solution. When the contents of the beater engine 4 is sufficiently treated, the valve 51 is lifted and the contents discharged into the stuff chest 2, the steam being withdrawn and discharged through a pipe 52, which leads to the centrifugal fan 47. The contents of the stuff chest 2 is then withdrawn by means of the centrifugal pump 21 which has a pipe connection 20 with the stuff chest and discharges the material through the pipe 22 into the saveall 23, the agitator 17ª keeping the pulp in motion. The saveall is of the Decker type and is provided with a press roll, which squeezes out as much as possible of the solution from the pulp and discharges it through the pipe 25, which conveys the pulp elsewhere to be treated for recovery of byproducts. If the material under treatment is finished in the two operations described, it is discharged from the saveall 23 through the pipe 28 which conveys it to a point where it can be washed, or bleached as required. If the material requires further treatment it may be returned to the beater engine 4 by means of the conveyor 26 which deposits the material on the conveyor 27, which conveyor 27 has its discharge end disposed above the beater engine 4. The time required to reduce the various raw materials varies from 2 to 4 hours. The solutions used are also of different chemical compositions suitable for the particular material to be treated, however it has been found that soda ash or lime gives the desired result.

From the above it will be seen that an apparatus is provided for treating green fibrous plants by a combined mechanical action of the beating engines, steam and chemical solutions so that they may be reduced to a pulp. It will also be seen that an apparatus is provided particularly adapted for production of pulp from green fibrous plants, which plants on account of their rapid decay cannot be transported great distances for treatment.

The invention having been set forth what is claimed as new and useful is:—

1. An apparatus for reducing fibrous material to a pulp, said apparatus comprising a shredding machine, a beating engine to one side of the shredding machine, a tiltable receiving receptacle adjacent one end of the beating machine, a separator disposed above the receiving receptacle, means for conveying material from the shredding machine to the separator, means whereby material within the tiltable receptacle may be discharged into the beating engine, a stuff chest disposed below the beating engine, a second beating engine disposed to one side of the first mentioned beating engine, means for conveying material from the stuff chest to the second beating engine, a stuff chest disposed beneath the second beating engine, means for conveying material from the second stuff chest, and valve means connecting the beating engine and the stuff chest whereby material within the beating engine may be allowed to flow into the stuff chests.

2. An apparatus for reducing fibrous material to a pulp, said apparatus comprising a shredding machine, spaced beating engines disposed to one side of the shredding machine, means for conveying material from the shredding machine to one of the beating engines, stuff chests disposed beneath the beating engines, valve controlled passages of communication between the beating engines and the stuff chests, means for supplying steam to the beating engines, a save-all adjacent one side of one of the beating engines, means for conveying material from adjacent stuff chests to the saveall, a separator interposed between the shredder and the adjacent beating engine and means whereby material passed into the beating engine adjacent the separator may be controlled as to quantity.

3. An apparatus for reducing fibrous material to a pulp, said apparatus comprising a shredding machine, a beating machine disposed adjacent the shredding machine, a separator disposed above and adjacent one end of the beating machine, means for conveying materials from the shredding machine to the separator, a tiltable material receiving receptacle disposed beneath the separator and adjacent one end of the beating machine, a stuff chest disposed below the beating machine, a valve controlled passage of communication between the beating machine and the stuff chest, means for supplying steam to the beating machine and means whereby excess steam collected in the stuff chest will be exhausted.

In testimony whereof I have signed my name to this specification in the presence of two subscribing witnesses.

HARRY ELLWOOD ELLIS.

Witnesses:
O. O. McCallum,
Henry C. Clark.